3,625,722
Patented Dec. 7, 1971

3,625,722
PROCESS FOR THE PREPARATION OF STABILIZED ALKALI METAL SILICATE SOLUTIONS
Helmut v. Freyhold, Dusseldorf, Oberkassel, and Volker Wehle, Hilden Rhineland, Germany, assignors to Philadelphia Quartz Company, Philadelphia, Pa.
No Drawing. Filed Jan. 2, 1968, Ser. No. 694,880
Claims priority, application Germany, Jan. 13, 1967, H 61,550
Int. Cl. C09d 1/04
U.S. Cl. 106—74                                 18 Claims

ABSTRACT OF THE DISCLOSURE

This application describes a process for preparing stable alkali metal silicate solutions with silica contents of from 10 to 35% and mole ratios ranging between 4.1 and 12:1 $SiO_2$:alkali metal oxide. Stability is obtained by incorporating sufficient amounts of certain quaternary ammonium compounds so that the mole ratio of silica to quaternary compound (calculated as quaternary ammonium oxide) ranges from 35:1 to 1000:1.

BACKGROUND

The alkali metal silicate solutions, often known as waterglass, are very old in the art and have many technical applications. They are used as binders in coatings, such as paints, as adhesives, in various special cements, especially for high temperature and acid resistance, and as raw materials for the production of finely divided silica or silica sols and gels, and indeed for the production of insoluble finely divided metal silicates wherein the metal is of higher order than alkali metals in the Periodic Table.

The properties of alkali metal silicates, such as viscosity, concentration, adhesive strength, rate of solidification, solubility in water, and stability of the solution are closely related and are largely controlled by the ratio of $SiO_2$ to metal oxide. Solutions with a low mole ratio, that is up to about 2 $SiO_2$:$Me_2O$, are very stable and have a low viscosity even at fairly high concentrations, but when they are used as binders or adhesives they set slowly and the bonds have little resistance to weathering, and therefore are not acceptable in such technical applications. Alkali meal silicate solutions having a mole ratio between 2 and 4 $SiO_2$:$Me_2O$ set more rapidly and the bond is less readily soluble but they do have undesirably high viscosities and low stabilities especially in the higher ranges above about 3.5. It is to be expected that the setting rate, bond strength, and the resistance to weather should increase as the mole ratio of silica to metal oxide is increased above about 4. Unfortunately, such soluitons are so unstable and so viscous as to be impractical either to manufacture by ordinary means or to employ in technical applications.

In many of these technical applications it is necessary to have solutions of alkali metal silicate at high concentrations with good adhesive properties, rapid setting rates, and bonds which are resistant to re-soltuion by water, and at the same time the alkali silicate solution should have a low viscosity and a good stability at ambient temperatures over long periods of time. This means that they should not change their properties or decompose on aging. In the past it has not been possible to prepare such solutions economically, if at all.

In many uses, also, the high alkalinity of the alkali metal solutions may be a drawback. This is particularly true when they are applied to alkali-sensitive material such as paper and cellulose products and when used in combination with organic binders and emulsions. Because of this need for alkali metal silicate solutions with a low alkalinity, silica sols were developed. These are dispersions of colloidal silicic acid practically free of alkali. They are very unstable at concentrations greater than about 6% unless special procedures are used to condense the silica to particle sizes usually above about 15 millimicrons where they lose the desired binding and film-forming properties. Because of the difficulties in preparing such sols, they are relatively expensive.

THE PRESENT INVENTION

This invention deals with the process of forming alkali metal silicate solutions having a silica content greater than about 10% and a mole ratio of silica to alkali metal oxide ($Me_2O$) greater than about 4 to 1 and preferably greater than about 4.5 to 1. These solutions are satbilized by the presence of ions of certain organic alkalies.

Our invention has as its aim the development of an alkali metal silicate soluiton which will fulfill the technical requirements outlined above without at the same time having the known drawbacks of known alkali metal silicate solutions. We have now made available solutions having a mole ratio of silica to metal oxide of greater than 4:1, and particularly greater than 4.5:1 which have the advantage of setting more rapidly than previous solutions, and these bonds are not only strong but practically water insolulbe. At the same time the solutions are quite stable and thus have a long shelf life. These soluitons also have low viscosities, generally less than 500 centipoises, and preferably less than about 200 centipoises.

We have been able to solve these problems by the addition of at least one water soluble mono and/or poly quaternary nitrogen compound which compound carries at least one non-hydroxylated alkyl group on the quaternary nitrogen atom, to an alkali metal silicate solution having a low mole ratio of silica to alkali metal oxide, in an amount such that the mole ratio of silica to quaternary nitrogen compound, calculated as quaternary ammonium oxide, will range from about 1000:1 to 35:1. The mole ratio of the silica to alkali metal oxide may then be adjusted in well-known ways to a value between 4:1 and 12:1. In general, we start with ordinary commercial alkali metal silicate soluitons having mole ratios of silica to metal oxide between about 2:1 and 4:1. We may use either sodium, potassium, or lithium silicate solutions, or mixtures of these.

The mono and/or poly quaternary nitrogen compounds may be added in either the solid or liquid form, or as aqueous solutions, to the alkali metal silicate solutions. It is also possible to use salts of the quaternary nitrogen compounds, and we especially suggest the use of chlorides, sulfates or nitrates. It is only necessary that these salts be sufficiently soluble in the alkali metal silicate solutions. In a preferred method, we add the quaternary nitrogen compounds as the hydroxides because in this way we achieve solutions with the lowest viscosities.

The water soluble quaternary nitrogen compounds which we employ must carry on the nitrogen atom at least one alkyl group which is not hydroxylated. The remaining three groups which are bound to the nitrogen may be either alkyl or alkanol radicals and they may be identical or different. The alkyl and alkanol radicals may be straight chain or branched, and the carbon chain may be interrupted by hetero atoms such as oxygen or nitrogen. Two of the groups on the nitrogen may be combined in the form of a ring. The total number of carbon atoms of the quaternary nitrogen compounds may vary to a large degree and are limited only by the need for water solubility or compatibility with the alkali metal silicate solution. These quaternary nitrogen compounds may have a radical with a chain length of up to about 18 carbon atoms. If more than one long chain radical is bound to the quaternary nitrogen atom, then the chain length should generally be limited to 12 carbon atoms or less. Quaternary nitrogen compounds of this invention may carry one or several quaternary nitrogen atoms. It is also possible to use mixtures of different quaternary nitrogen compounds.

In general, we prefer that the quaternary nitrogen compounds carry four alkyl groups on the nitrogen atom. Mono and/or poly quaternary nitrogen compounds having short alkyl radicals with from 1 to 4 carbon atoms bound to the nitrogen have been found to be particularly effective.

For example, quaternary nitrogen hydroxide having the following formulas may be used:

(a) $[N(CH_3)_4]OH$ (b) $[N(C_2H_5)_4]OH$ (c) $[N(C_4H_{13})_4]OH$ (d) $[(CH_3)_2N(C_{10}H_{21})_2]OH$ (e) $[(CH_3)_3N(C_{12}H_{25})]OH$ (f) $[(CH_3)N(C_2H_4OH)_3]OH$ (g) $[(C_2H_5)_2N(C_2H_4OH)_2]OH$ (h) $[(CH_3)_3N(CH_2)_6N(CH_3)_3](OH)_2$ (i) $[(CH_3)_3N(CH_2)_{12}N(CH_3)_3](OH)_2$ (j) $\left[ HO-CH-CH_2-\underset{\underset{CH_3}{|}}{\overset{\overset{CH_3}{|}}{N}}-(CH_2)_2-\underset{\underset{CH_3}{|}}{\overset{\overset{CH_3}{|}}{N}}-CH_2-CH-OH \right](OH)_2$
with $CH_3$ groups (k) $\left[ (CH_3)_3N-(CH_2)_2-\underset{\underset{CH_3}{|}}{\overset{\overset{CH_3}{|}}{N}}-(CH_2)_2-N(CH_3)_3 \right](OH)_3$ (l) $\left[ -\underset{\underset{CH_3}{|}}{\overset{\overset{CH_3}{|}}{N}}(CH_2)_{10}-\underset{\underset{CH_3}{|}}{\overset{\overset{CH_3}{|}}{N}}-(CH_2)_{12}- \right]_n (OH)_2 \quad n=20-100$ (m) $\left[ C_6H_{13}-\underset{\underset{CH_3}{|}}{\overset{\overset{CH_3}{|}}{N}}-(C_2H_4O)_5-H \right] OH$ (n) $\left[ (CH_3)_3N-(CH_2)_2-\underset{\underset{CH_3}{|}}{N}-(CH_2)_2N(CH_3)_3 \right](OH)_2$ and (o) $\left[ O \underset{CH_2-CH_2}{\overset{CH_2-CH_2}{\diagdown}} \underset{C_{12}H_{25}}{\overset{CH_3}{N}} \right] OH$ We express the quaternary nitrogen compound as the quaternary ammonium oxide corresponding to the usual calculation of alkali metals as alkali metal oxides. In carrying out our process we add the quaternary nitrogen compounds to the alkali metal silicate solutions in sufficient amount to obtain a mole ratio of silica to quaternary ammonium oxide in the range of from about 1000:1 to about 35:1, but we prefer that the mole ratio be restricted to the ranges of about 500:1 to about 40:1. The amount by weight of the quaternary nitrogen compound used is calculated on the total silica content by weight in the solution, and greater amounts may be needed when the solutions contain other foreign ions.

After the addition of the quaternary nitrogen compound, the mole ratio of silica to alkali metal oxide is adjusted to between about 4:1 and 12:1 by the addition of silica in one form or another. Mole ratios at the lower limit, i.e. 4:1, do not exhibit the water resistance after setting which may be obtained from mole ratios above about 4.5:1. As the upper limit of silica to alkali metal oxide is reached or exceeded, the adhesion and film-forming properties become poorer. It is therefore preferred that the mole ratio of silica to alkali metal oxide be adjusted to between about 4.5:1 and 9:1. The adjustment of these mole ratios by the addition of silica permits an increase in the silica content in the solutions at the same time. The silica must be added in a form which is soluble in the alkali metal silicate, that is it may be added as a finely divided precipitated silica, a silica sol, a silica gel, or any other composition soluble in the alkali metal silicate which will give the required final composition, and the silica may be brought into solution by means known to the art, e.g. by boiling.

It also will be immediately recognized that the mole ratio of silica to alkali metal oxide may be adjusted by decreasing or removing the alkali metal ions. The free alkali metal ions present may be measured by titrating with methyl red. These are the alkali metal ions which are available to the silicic acid and determine the alkalinity of the solution. The mole ratio is then the ratio of silica to the free alkali metal oxide. The alkali metal ions may be tied up sufficiently by the addition of acid, such as sulfuric acid, hydrochloric acid, or nitric acid. These, of course, reduce the alkalinity of the solution when titrated against methyl red. Even with the addition of these foreign ions in neutralizing the alkali metal silicate, the viscosity of the final solution does not increase significantly. Furthermore, if the alkali metal silicate is lithium silicate, the alkali metal ions may be removed by precipitation as with phosphoric or hydrofluoric acid.

Another obvious means of removing the alkali metal ions from the alkali metal silicate solutions is by the use of ion exchange resins. We have found that it is particularly advantageous to carry out such a reaction with ion exchange resins in concentrated solutions containing more than 10% $SiO_2$ without inactivating the ion exchange resin. With simple alkali metal silicate solutions, this is not readily accomplished. Thus we eliminate the generally difficult process of concentrating the alkali metal silicate solutions.

Alkali metal silicate solutions prepared according to our invntion generally contain from 10 to 35% $SiO_2$, or even greater, but in general we prefer the concentration to be between 15 nd 30%. These alkali metal silicate solutions of our invention are stable for long periods of time without changing their properties. The viscosities are low even at concentrations high in silica and at high ratios of silica to alkali metal oxide. Moreover, the solutions of our invention, as formed in the folowing examples, set very quickly when they are used as binders for adhesives, and indeed these setting times are generally shorter than with standard alkali metal silicate solutions. Their film-forming and binder properties are execptionally good and we find that the bonds formed are quite insoluble.

EXAMPLES

In the folowing examples, "parts" is understood as parts by weight "%" means percent by weight. The viscosity was measured at 20° C. with a Brookfield viscometer.

EXAMPLE 1

A solution of sodium silicate containing 22.1% of $SiO_2$ and having a mole ratio of 3.9 $SiO_2$:1 $Na_2O$ was mixed with hexamethyl-hexamethylene diammonium hydroxide in an amount calculated to give a mole ratio of silica to quaternary nitrogen compound based on the total silica content of the final solution of 850 $SiO_2$:1 quaternary ammonium oxide. In this case, 655 parts of the sodium silicate was mixed with the required amount of quaternary nitrogen compound and the mixture was heated to boiling. In order to raise the ratio, 63 parts of finely divided precipitated hydrated silica, known as ULTRASIL VM 3, sold by Degussa, Inc., was added. This finely divided silica contained 87.5% of $SiO_2$. The mixture was heated to the boiling point and continuously stirred until the Ultrasil dissolved and the solution became clear. This resulting batch was then cooled to 50–60° C. and 200 parts of water was added. A clear, stable sodium silicate solution having a low viscosity of 40–50 cp. was obtained. The mole ratio was 5.2 $SiO_2$:1 $Na_2O$ and the solution contained 21.8% of silica. We found that this new composition had excellent binding properties and the bonds formed were insoluble in water and resistant to weathering.

EXAMPLE 2

In this example 593 parts of sodium silicate having 22.1% of silica and a ratio of 3.9 $SiO_2$:1 $Na_2O$ was mixed with 48 parts of an aqueous solution containing 30% of tetramethylammonium hydroxide. The mixture was heated to boiling. We then added 96.2 parts of the finely divided silica mentioned in Example 1, and the heating was continued until the system clarified. The mixture was then diluted with 162 parts of water and a stable sodium silicate solution having a low viscosity of 70–80 cp. and a mole ratio of 6.4 $SiO_2$:1 $Na_2O$ and 24% $SiO_2$ was obtained. In this example, the mole ratio of silica in the final solution to quaternary nitrogen compound calculated as the ammonium oxide was 44 $SiO_2$:1 quaternary ammonium oxide.

EXAMPLE 3

Another solution was obtained by mixing 1000 parts of sodium silicate having 22.1% of silica and a mole ratio of 3.9 $SiO_2$:1 $Na_2O$ with tetraethylammonium hydroxide in an amount such that the mole ratio obtained was 95 $SiO_2$ to 1 quaternary nitrogen oxide. The mixture was heated to 100° C. and agitated strongly. Finally, 25 parts of concentrated sulfuric acid, diluted 1 part of sulfuric acid to 4 of water, was added dropwise. During this addition a precipitate formed but redissolved in a short period of time, and a sodium silicate solution containing 19.4% of silica and having a mole ratio of 5.4 $SiO_2$ to 1 mole of free $Na_2O$, as determined by titration against methyl red, was obtained. The solution was clear, had a low viscosity of 30–40 cp., and was stable for a long period of time.

EXAMPLE 4

In this example 1000 parts of lithium silicate solution having 20.7% of $SiO_2$ and a mole ratio of 3.7 $SiO_2$:1 $Li_2O$ was mixed with 15.5 parts of a 20% solution of tetraethylammonium hydroxide and this was followed by the addition of 3.6 parts of a solution of 85% phosphoric acid diluted 1 part of phosphoric acid to 3 parts of water. After a short period of stirring, the precipitated lithium phosphate was removed with a centrifuge and the lithium silicate solution obtained had a silica content of 15.9% and a mole ratio of 7.5 $SiO_2$:$Li_2O$. The mole ratio of silica to quaternary nitrogen compound, calculated as the ammonium oxide, was 35:1. The clear, stable solution of lithium silicate which we obtained had a low viscosity of 30–40 cp. and excellent properties as a binder and adhesive.

EXAMPLE 5

A lithium silicate solution containing 20.0% of $SiO_2$ and having a mole ratio of 2.7 $SiO_2$:$Li_2O$ was mixed with tetraethylammonium hydroxide in such amount that the mole ratio was 100 $SiO_2$:1 quaternary ammonium oxide. The mixture containing 500 parts of the lithium silicate and the required tetraethylammonium hydroxide was agitated strongly and 565 parts of an ion exchange resin in the hydrogen form and having a strongly acid reaction was added together with enough water to keep the mixture dilute enough to be stirred. The ion exchange resin was then filtered off after about 20 minutes and the clear, stable lithium silicate solution which we obtained had a low viscosity of 20–25 cp., a silica content of about 14.5%, and a mole ratio of 6.3 $SiO_2$:1 $Li_2O$.

EXAMPLE 6

In this example 500 parts of a potassium silicate solution containing 20.2% of $SiO_2$ and having a ratio of 3.2 $SiO_2$ to 1 $K_2O$ was mixed with enough tetraethylammonium hydroxide to give a mole ratio of 92 $SiO_2$:1 quaternary ammonium oxide, and then 250 parts of a strongly acid ion exchange resin in the hydrogen form was added with stirring. This system was filtered after 20 minutes and the potassium silicate solution we obtained was stable, had a low viscosity of 20–25 cps., a silica content of about 18.7%, and a mole ratio of 4.5 $SiO_2$:1 $K_2O$.

EXAMPLE 7

In this example 500 parts of lithium silicate solution containing 20% of $SiO_2$ and having a mole ratio of 3.6 $SiO_2$:$Li_2O$ was mixed with sufficient hexamethyl decamethylene diammonium hydroxide so that the mole ratio in the final solution was 142 $SiO_2$ quaternary ammonium oxide. This mixture was then agitated strongly and 500 parts of a silica sol containing 30% of $SiO_2$ was added. The lithium silicate solution we obtained was clear and stable. The viscosity was low as in the earlier examples and the silica content was 25% and the mole ratio ratio was 9 $SiO_2$:1 $Li_2O$. This solution also had excellent properties for technical application.

EXAMPLE 8

Again, 500 parts of sodium silicate solution containing 30.5% of $SiO_2$ and having a mole ratio of 3.14 $SiO_2$:$Na_2O$ was mixed with sufficient hexamethyl decamethylene diammonium hydroxide to give a ratio of 136 $SiO_2$:1 quaternary ammonium oxide, based on the total silica content of the final solution. Then 500 parts of a silica sol containing 30% of $SiO_2$ was added with strong agitation. The sodium silicate solution obtained was clear and stable. It had a low viscosity as in the earlier examples, a mole ratio of 6.28 $SiO_2$:1 $Na_2O$ and a silica content of 30.2%.

EXAMPLE 9

We mixed 2000 parts of sodium silicate solution containing 22.13% of $SiO_2$ and having a mole ratio of 3.9 $SiO_2$:1 $Na_2O$ and a viscosity of 58 centipoises with 20.2 parts of a solution containing 24.8% of tetramethylammonium hydroxide. This we marked as Sample A. Sample B is the same except that it contained 20.2 parts of a solution containing 34.5% of tetramethylammonium chloride. Thus we compare the effects of the salt and the hydroxide. For comparison, solution C was prepared by adding 20.2 parts of water instead of the quaternary nitrogen compounds to the original sodium silicate. Then to these mixtures we added 50 parts of the silica gel described in Example 1 and each mixture was boiled until it became clear. The mole ratio in A and B was 300 $SiO_2$:1 quaternary ammonium oxide. After the solutions were cooled, the viscosities were measured with a Brookfield viscometer at regular time intervals and the results are given in Table 1. In each case, of course, the final mole ratio became 4.35 $SiO_2$:$Na_2O$ and the silica content was about 24%.

TABLE 1

| Time (hours) | Viscosities (cps.) | | |
|---|---|---|---|
| | A | B | C |
| 1 | 62 | 122 | 320 |
| 3 | 59 | 115 | 400 |
| 5 | 58 | 115 | 440 |
| 20 | 58 | 115 | 635 |
| 22 | 58 | 115 | 660 |
| . | . | . | . |
| . | . | . | . |
| . | . | . | . |
| 168 | 60 | 115 | 5,000 |

As can be seen from Table 1, when the sodium silicate solution is merely diluted with water the viscosity increase strongly. However, the addition of the quaternary nitrogen compounds prevents the great increase in viscosity and the solutions are stable and maintain these low viscosities over long periods of time.

EXAMPLE 10

A sodium silicate solution containing 36% $SiO_2$ and having a mole ratio of 2.0 $SiO_2:Na_2O$ was mixed with sufficient tetraethylammonium hydroxide to provide a mole ratio of 100 $SiO_2$ to 1 quaternary ammonium oxide. The mixture of 1000 parts of the sodium silicate and the added quaternary ammonium hydroxide was stirred with about 1500 parts of the ion exchange resin in Example 5 and enough water to maintain a fluid mixture. The resin was filtered off and a clear stable sodium silicate of approximately 25% $SiO_2$ and a mole ratio of about 7 $SiO_2:1\ Na_2O$ remained.

PRIOR ART

U.S. Pat. No. 3,113,112 refers to the preparation of stable alkali metal silicate solutions by the rather difficult and expensive process of treating an alkali metal silicate solution with a cation exchange resin adjusted to a pH between 6 and 8 so as to remove part of the alkali. Obviously they contain no quaternary ammonium compounds.

U.S. Pat. No. 2,601,352 describes concentrated silica sols which are stabilized by the addition of organic nitrogen bases. In contrast to the alkali meaal silicate solutions of our invention, these are sols in which the silica has been condensed so that the particle size is above about 15 millimicrons and the sodium content is extremely low. The examples indicate an alkali-silica ratio of about 500 $SiO_2:Na_2O$.

U.S. Pat. No. 3,239,549 refers to the preparation of mixed alkali metal quaternary ammonium silicates. These are readily soluble but contain considerably more organic nitrogen base than is present in our invention here described and are prepared by first forming an organic ammonium silicate and then mixing with an alkali silicate as contrasted with our use of costly quaternary ammonium alkalies in small amounts as stabilizers.

More or less specific claims will be presented hereinafter and even though such claims are rather specific in nature, those skilled in the art to which this invention pertains will recognize that there are obvious equivalents for the specific materials recited therein. Some of these obvious equivalents are disclosed herein and other obvious equivalents will immediately occur to one skilled in the art and still other obvious equivalents could be readily ascertained upon rather simple routine non-inventive experimentation. Certainly no invention would be involved in substituting one or more of such obvious equivalents for the materials specifically recited in the claims. We intend that all such obvious equivalents be encompassed within the scope of this invention and patent grant in accordance with the well known doctrine of equivalents as well as changed proportions of the ingredients which do not render the composition unsuitable for the disclosed purposes.

In the claims the expression "$SiO_2:Me_2O$" has been used as a shorthand designation for "silica to alkali metal oxide."

What we claim is:

1. A stable solution consisting essentially of an alkali metal silicate and a quaternary nitrogen compound, said stable solution having upon analysis:
   (a) a $SiO_2$ concentration greater than about 10%,
   (b) a $SiO_2:Me_2O$ mole ratio within the range of 4.5:1 to 9:1, and
   (c) a mole ratio of silica to quaternary nitrogen compound (calculated as quaternary ammonium oxide) within the range from about 1000:1 to 35:1, said quaternary nitrogen compound being a water soluble member of the group consisting of mono and poly quaternary nitrogen compounds having at least one non-hydroxylated alkyl group on the quaternary nitrogen atom.

2. The composition of claim 1 where the alkali metal is sodium.

3. The composition of claim 1 wherein the alkali metal is potassium.

4. The composition of claim 1 where the alkali metal is lithium.

5. The composition of claim 1 where the quaternary nitrogen is a quaternary nitrogen hydroxide.

6. The composition of claim 1 where the quaternary nitrogen compound has 4 alkyl groups on the nitrogen atom.

7. The composition of claim 1 where the quaternary nitrogen compound is taken from the group consisting of mono and poly quaternary nitrogen compounds in which the alkyl radicals bound to the nitrogen atom have from one to four carbon atoms.

8. A stable solution according to claim 1 wherein the quaternary ammonium compound is one selected from the group consisting of:

(a) $[N(CH_3)_4]OH$
(b) $[N(C_2H_5)_4]OH$
(c) $[N(C_4H_{13})_4]OH$
(d) $[(CH_3)_2N(C_{10}H_{21})_2]OH$
(e) $[(CH_3)_2N(C_{12}H_{25})]OH$
(f) $[(CH_3)N(C_2H_4OH)_3]OH$
(g) $[(C_2H_5)_2N(C_2H_4OH)_2]OH$
(h) $[(CH_3)_3N(CH_2)_6N(CH_3)_3](OH)_2$
(i) $[(CH_3)_3N(CH_2)_{12}N(CH_3)_4](OH)_2$
(j) $\left[ HO-CH-CH_2-\underset{\underset{CH_3}{|}}{\overset{\overset{CH_3}{|}}{N}}-(CH_2)_2-\underset{\underset{CH_3}{|}}{\overset{\overset{CH_3}{|}}{N}}-CH_2-CH-OH \right] (OH)_2$
(k) $\left[ (CH_3)_3N-(CH_2)_2\underset{\underset{CH_3}{|}}{\overset{\overset{CH_3}{|}}{N}}-(CH_2)_2-N(CH_3)_3 \right] (OH)_3$
(l) $\left[ -\underset{\underset{CH_3}{|}}{\overset{\overset{CH_3}{|}}{N}}-(CH_2)_{10}-\underset{\underset{CH_3}{|}}{\overset{\overset{CH_3}{|}}{N}}-(CH_2)_{12}- \right]_n (OH)_{2n}\ n=20\text{-}100$
(m) $\left[ C_6H_{13}-\underset{\underset{CH_3}{|}}{\overset{\overset{CH_3}{|}}{N}}-(C_2H_4O)_3-H \right] OH$
(n) $\left[ (CH_3)_3N-(CH_2)_3-\underset{\underset{CH_3}{|}}{N}-(CH_2)_2N(CH_3)_3 \right] (OH)_2$ and (o) $\left[ O\underset{\diagdown CH_2-CH_2}{\diagup^{CH_2-CH_2}} N \underset{\diagdown C_{12}H_{25}}{\diagup^{CH_3}} \right] OH$ 9. A method for producing a stable solution consisting essentially of an alkali metal silicate and a quaternary nitrogen compound, said stable solution having upon analysis a $SiO_2$ concentration greater than about 10%, a $SiO_2:Me_2O$ mole ratio greater than about 4:1, a $SiO_2$:quaternary ammonium oxide mole ratio of between about 35:1 and 1000:1, said quaternary nitrogen compound being a water soluble member of the group consisting of mono and poly quaternary nitrogen compounds having at least one non-hydroxylated alkyl group on the quaternary nitrogen atom, said method comprising:
   (a) admixing together
      (1) an alkali metal silicate solution having a $SiO_2:Me_2O$ ratio below about 4:1, and
      (2) a quaternary nitrogen compound as set forth above, and
   (b) thereafter adjusting the $SiO_2:Me_2O$ ratio to within the range of 4:1 and 12:1 by any desired means, and
   (c) recovering a stable solution.

10. A method according to claim 9 wherein the $SiO_2:Me_2O$ range in step (b) is adjusted to the range of about 4.5:1 to 9:1.

11. The process of claim 10 wherein the quaternary nitrogen compound is an hydroxide.

12. The process of claim 10 wherein the quaternary nitrogen compound is selected from the group consisting of mono and poly quaternary nitrogen compounds in which the alkyl radicals on the nitrogen atom have from 1 to 4 carbon atoms.

13. The process of claim 10 wherein ratio in step (b) is adjusted within the range of 4.5:1 to 9:1.

14. The process of claim 10 in which the ratio in step (b) is adjusted by dissolving silica in the solution.

15. The process of claim 10 in which the ratio in step (b) is adjusted by neutralizing part of the alkali metal ions.

16. The process of claim 10 in which the ratio in step (b) is adjusted by removing part of the alkali metal ions by means of an ion exchange resin.

17. The process of claim 10 in which the alkali metal oxide is lithium oxide and the ratio in step (b) is adjusted by precipitating a portion of the lithium ions.

18. The process of claim 10 wherein the quaternary ammonium compound is one selected from the group consisting of:

(a) $[N(CH_3)_4]OH$ (b) $[N(C_2H_5)_4]OH$ (c) $[N(C_6H_{13})_4]OH$ (d) $[(CH_3)_2N(C_{10}H_{21})_2]OH$ (e) $[(CH_3)_3N(C_{12}H_{25})]OH$ (f) $[(CH_3)N(C_2H_4OH)_3]OH$ (g) $[(C_2H_5)_2N(C_2H_4OH)_2]OH$ (h) $[(CH_3)_3N(CH_2)_6N(CH_3)_3](OH)_2$ (i) 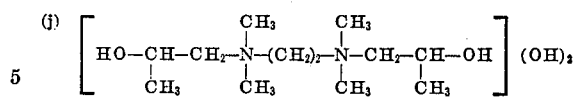

(j) 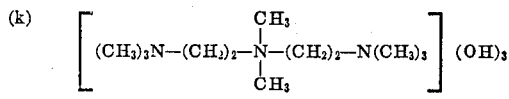

(k) 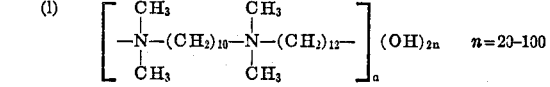

(l) 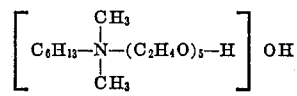   $n=20-100$ (m) 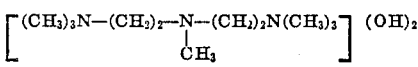

(n) $[(CH_3)_3N-(CH_2)_2-N-(CH_2)_2N(CH_3)_3](OH)_2$ with $CH_3$ branch on middle N and (o) 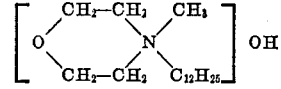

References Cited
UNITED STATES PATENTS
3,453,122    7/1969    Weldes et al.    106—38.35
3,475,185   10/1969    Von Freyhold    106—1

JAMES E. POER, Primary Examiner

U.S. Cl. X.R.
106—84